United States Patent [19]

Gay et al.

[11] Patent Number: 4,636,552

[45] Date of Patent: Jan. 13, 1987

[54] NOVEL SILICONE/POLYLACTONE GRAFT COPOLYMER

[75] Inventors: Michel Gay, Lyons; Claude Millet, Saint-Priest, both of France

[73] Assignee: Rhone-Poulenc Recherches, Courbevoie, France

[21] Appl. No.: 739,195

[22] Filed: May 30, 1985

[30] Foreign Application Priority Data

May 30, 1984 [FR] France ............... 84 08510

[51] Int. Cl.$^4$ .............. C08G 77/42; C08L 83/10
[52] U.S. Cl. ................... 525/63; 525/410; 525/411; 525/415; 525/440; 525/474; 528/26; 528/27; 604/403
[58] Field of Search .......... 525/415, 474, 410, 418, 525/63, 440; 528/26, 27; 604/403

[56] References Cited

U.S. PATENT DOCUMENTS 3,631,087 12/1971 Lewis et al. ............ 525/479
3,778,458 12/1973 Morehouse ............. 525/415
4,202,807 5/1980 Moretto et al. ......... 525/474

FOREIGN PATENT DOCUMENTS 1944969 3/1970 Fed. Rep. of Germany .
2168221 8/1973 France .
0207922 11/1984 Japan ................... 528/26

Primary Examiner—Wilbert J. Briggs, Sr.
Attorney, Agent, or Firm—Burns, Doane, Swecker & Mathis

[57] ABSTRACT

Novel silicone/polylactone graft copolymers, well suited as polymer composition additives, especially those destined for biomedical applications, have the average general formula:

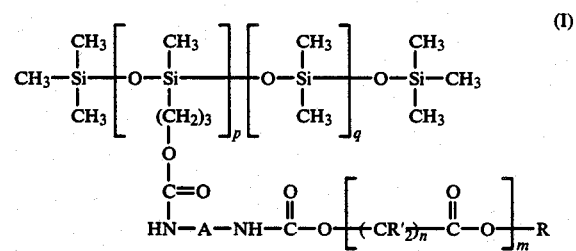

in which p is an integer or decimal ranging from 1.5 to 6, q is an integer or decimal ranging from 0 to 20, A is a divalent hydrocarbon having from 2 to 20 carbon atoms, n is an integer ranging from 3 to 12, m is an integer ranging from 2 to 25, the radicals R', which may be identical or different, are each hydrogen or $C_1$–$C_4$ alkyl, and R is a hydrocarbon having up to 24 carbon atoms.

17 Claims, No Drawings

NOVEL SILICONE/POLYLACTONE GRAFT COPOLYMER

BACKGROUND OF THE INVENTION

1. Field of the Invention

The present invention relates to a novel graft copolymer comprising a silicone backbone and having polylactone grafts linked thereto via urethane bonds, a process for the preparation thereof, and to the use of such graft copolymer, especially for biomedical applications, as an additive for polymer compositions, in particular for compositions based on polyvinyl chloride and copolymers thereof.

2. Description of the Prior Art

It is known to this art to prepare polydiorganosiloxane and polyurethane block copolymers optionally comprising polyester linkages. See French Pat. No. 1,291,937.

French Pat. No. 1,427,660 describes the use of addition products of organopolysiloxanes and of polyisocyanates, which may be the same as those described in said French Pat. No. 1,291,937, as additives for polyvinyl chloride in a proportion of from 0.01 to 30% by weight of additive to improve such PVC processing parameters as extrusion, calandering, and the like.

In French Pat. No. 2,005,037 block copolymers are generally described, including polysiloxane-polylactone which may be employed as an additive to modify the surface properties of PVC, without explicitly referring to biomedical applications thereof, and features a particular polysiloxane-polylactone block copolymer.

In French Pat. No. 2,007,788, compositions are described which contain copolymers including blocks of lactone and polysiloxane which can be employed as surface-active agents and/or foam stabilizers in foam manufacture, the polysiloxane and polylactone blocks being linked via an organic connecting bridge containing from 2 to 12 carbon atoms, albeit no mention is made of a urethane such linkage.

And in French Pat. No. 2,017,527 are described copolymers comprising polysiloxane and polyetherurethane blocks, the said blocks being joined via siliconnitrogen bonds, and such copolymers exhibiting high blood-compatibility.

Blood-compatible block polymers containing a series of polyalkylsiloxane, polyurethane or polyureaurethane and polyalkylene oxide blocks are described in French Pat. Nos. 2,491,938 and 2,497,217. The possibility of graft copolymers is referred to at page 8, lines 9 to 20, and page 11, lines 9 to 14, respecting a polydimethylsiloxane containing hydroxyalkyl end groups, but such graft copolymers are not explicitly described.

Moreover, the linking of a polylactone to a polysiloxane bearing hydroxyalkyl groups in the chain via a urethane bridge is neither suggested nor described.

SUMMARY OF THE INVENTION

Accordingly, a major object of the present invention is the provision of a novel graft copolymer comprising a silicone backbone and having polylactone grafts linked thereto via a urethane bridge, said novel graft copolymer being admirably suited as an additive for many polymer compositions consisting of polymers, copolymers, elastomers and resins, and more particularly for vinyl chloride polymers (PVC) and copolymers thereof, as a plasticizer, process aid and/or an agent for imparting biocompatibility.

Another object of the present invention is the provision of an improved process for industrial production of such novel graft copolymer.

Still another object of the present invention is the provision of a novel graft copolymer having a simple chemical structure and which is inexpensive to produce, being prepared from raw materials which are readily commercially available or else are very easy to prepare.

Briefly, the present invention features novel graft copolymers comprising a silicone backbone, having polylactone grafts linked thereto and having the average general formula:

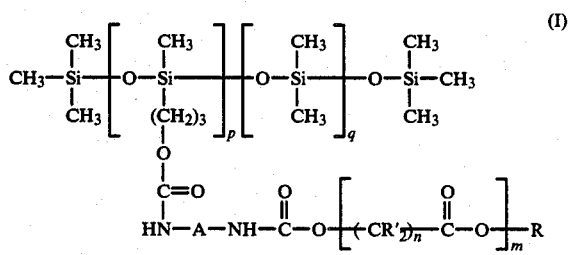

in which: p is an integer or decimal ranging from 1.5 to 6, inclusive, preferably from 2 to 4, inclusive, and q is an integer or decimal ranging from 0 to 20, inclusive, preferably from 6 to 15.

Preferably, in formula (I) the graft methylhydroxypropylsiloxane units are separated by at least one, preferably at least 2, dimethylsiloxane units. A is a divalent hydrocarbon radical containing from 2 to 20 carbon atoms, inclusive, preferably from 4 to 15 carbon atoms, inclusive, and which comprises a hydrocarbon residue of a diisocyanate molecule.

Preferably, A is a straight chain alkyl radical containing from 4 to 15 carbon atoms, such as, for example, those selected from among $-(CH_2)_4-$, $-(CH_2)_5-$ and $-(CH_2)_6-$.

Radicals A solely containing alkyl, cycloalkyl or aryl residues, in particular phenyl, can also be employed, such as, for example, the following radicals A:

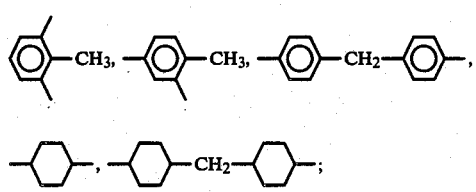

n is an integer ranging from 3 to 12, inclusive, preferably n is 3, 4 or 5; m is an integer ranging from 2 to 25, preferably from 4 to 14, inclusive; the radicals R', which are identical or different, denote a hydrogen atom or a $C_1$–$C_4$ alkyl radical; R is a hydrocarbon radical containing at most 24 carbon atoms, preferably selected from among a straight or branched chain $C_2$–$C_{24}$ alkyl radical, preferably $C_{14}$–$C_{20}$, and a phenylalkyl radical in which the straight or branched chain alkyl moiety is $C_1$–$C_{20}$. Preferably R' is a hydrogen atom and n is an integer of 3, 4 or 5 and, more preferably, n=5.

The present invention also features two individual processes for preparation of the graft copolymers having the formula (I). It additionally features the materials obtained directly by these two processes, as well as the use of such materials as an additive for polymer compositions, based on various polymers, copolymers and resins, in particular based on PVC and its copolymers, especially for biomedical applications.

DETAILED DESCRIPTION OF THE INVENTION

More particularly according to the present invention, the following are well suited as starting materials consistent herewith.

First, suitable starting material siloxanes include those of the formula:

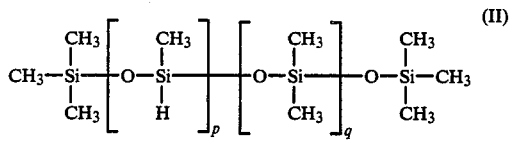

in which: p ranges from 1.5 to 6, inclusive, preferably from 2 to 4, and q ranges from 0 to 20, inclusive, preferably from 6 to 15.

These materials are well known to the silicone industry and are generally commercially available; they are described, for example, in U.S. Pat. Nos. 3,220,942, 3,341,111 and 3,436,366.

Allyl alcohol is reacted with the siloxanes of formula (II), for example, according to the process described in U.S. Pat. No. 2,970,150.

Siloxanes of the following formula (III) are thus obtained, certain of which are already commercially available:

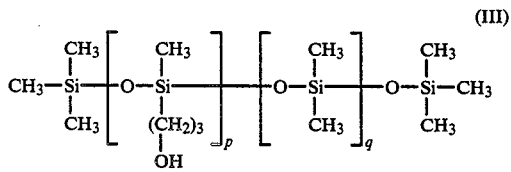

in which p and q are as above defined.

To effect the reaction between allyl alcohol and the siloxanes of formula (II), a catalyst is advantageously used, typically platinum complexes, especially the platinum/olefin complexes as described in U.S. Pat. Nos. 3,159,601 and 3,159,662, products of the reaction of platinum derivatives with alcohols, aldehydes and ethers, described in U.S. Pat. No. 3,220,972, the platinum/vinylsiloxane catalysts described in French Pat. No. 1,313,846 and its Patent of Addition thereto, No. 88,676, and French Pat. No. 1,480,409, as well as the Pt° complexes described in U.S. Pat. Nos. 3,715,334, 3,775,452 and 3,814,730.

Siloxanes whose molecular masses range from 600 to 5000 are preferred as the materials having the formula (III). In fact, siloxanes having molecular masses greater than 5000 have a high viscosity which can subsequently interfere with preparation of the copolymers of formula (I).

The siloxanes which are even more preferred are those having the formula (III) in which all of the methylgammahydroxypropylsiloxane recurring units are separated from each other by at least one, preferably at least 2, dimethylsiloxane units.

Representative of the diisocyanates which are reacted with the siloxanes of formula (III), exemplary are diisocyanates having the formula:

$$OCN-A-NCO \quad (IV)$$

in which A is a divalent hydrocarbon radical containing from 2 to 20 carbon atoms, inclusive, preferably from 4 to 15 carbon atoms, inclusive.

Specific examples of isocyanates which are representative are ethylene diisocyanate, propylene diisocyanate, tetramethylene diisocyanate, pentamethylene diisocyanate, hexamethylene diisocyanate, octamethylene diisocyanate, undecamethylene diisocyanate, dodecamethylene diisocyanate, bis-3,3'-isocyanatopropyl ether, 1,3-cyclopentylene diisocyanate, 1,4-cyclohexylene diisocyanate, 2,4-tolylene diisocyanate, 2,6-tolylene diisocyanate, 1,4-xylylene diisocyanate, 1,3-xylylene diisocyanate, 4,4'-diphenylmethane diisocyanate, 4,4'-dicyclohexylmethane diisocyanate, 2-nitro-4,4'-diphenylmethane diisocyanate, 4,4'-diphenylpropane diisocyanate, p-isocyanatobenzyl isocyanate, m-phenylene diisocyanate, p-phenylene diisocyanate, 1,4-naphthalene diisocyanate, 1,5-naphthalene diisocyanate, furfurylidene diisocyanate, p,p',p"-triphenylmethane triisocyanate, 4,6,4'-diphenyl triisocyanate, and the like.

The preferred diisocyanates are tetramethylene diisocyanate and pentamethylene diisocyanate, and most preferred is hexamethylene diisocyanate. Nevertheless, it is possible to employ aromatic or alicyclic diisocyanates which are generally commercially available, such as 2,4- or 2,6-tolylene diisocyanate, 4,4'-diphenylmethane diisocyanate, 1,4-cyclohexylene diisocyanate and 4,4'-dicyclohexylmethane diisocyanate.

Another starting material comprises a polylactone with a monohydroxy end group and which may incorporate $C_1-C_4$ alkyl units, preferably epsilon-caprolactone units, having the formula:

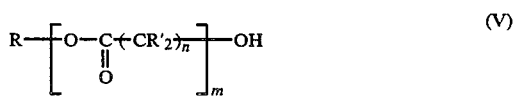

in which R, R', n and m have the same definitions as in the formula (I) above.

The monohydroxy polylactone of formula (V) is prepared in known manner by reacting m moles of lactone with 1 mole of the corresponding alcohol ROH.

Examplary of lactones which may be employed for reaction with the alcohol ROH, representative are gamma-butyrolactone, delta-valerolactone and preferably epsilon-caprolactone; other lactones can be used, such as, for example, beta-propiolactone and the lactone of 7-hydroxyheptanoic acid.

The preferred polylactones of formula (V) are those having molecular weights ranging from about 500 to 3000.

In a first process according to this invention, referred to as process (1), for the preparation of the graft copolymers having the formula (I), one mole of a monohydroxy polylactone of formula (V) is reacted, in suitable reactor, with one mole of a diisocyanate of formula (IV) at a temperature of from 90° to 140° C., preferably in the region of 110° C. for a period of time ranging from 10 minutes to 2 hours, and then a polysiloxane of formula (III) in a quantity such that only approximately one equivalent of methylgammahydroxypropylsiloxane units is present, is added to the same reactor, in the presence of an organic solvent, for example butyl acetate, at a temperature ranging from 90° to 140° C.

The reaction product obtained, containing a graft copolymer of formula (I) mixed with byproducts, can be employed as such as an additive for polymer compositions, and can otherwise be used for all applications according to this invention.

In a second process according to the invention, referred to as process (2), graft copolymers of formula (I) are produced in a higher degree of purity, and consistent therewith, in a first step, one mole of a polylactone of formula (V) is reacted, in suitable reactor, at a temperature ranging from 90° to 140° C. with a molar excess, usually of 4 to 10 moles and preferably from 6 to 8 moles, of a diisocyanate of formula (IV); upon completion of the reaction, the excess diisocyanate is removed.

The excess diisocyanate can be removed by any appropriate means, for example, by evaporation using a stirred film evaporator.

In a second step, a polysiloxane of formula (III) is added to the product formed during the first step in an organic solvent medium, for example, in butyl acetate, at a temperature of from 90° to 160° C., in a quantity such that only approximately one equivalent of methylgammahydroxypropylsiloxane units is added.

The reaction product obtained, containing principally a graft copolymer of formula (I), too can be employed as an additive for polymer compositions and also can otherwise be used for all applications according to this invention.

The graft copolymers according to the invention can be employed very advantageously as an additive for polymer compositions based on polymers, copolymers and resins, notably for modifying the surface properties and characteristics thereof, which is more particularly advantageous for biomedical applications, especially to impart biocompatibility, and above all a remarkable haemocompatibility, to such base polymer compositions. These polymer compositions comprise any composition capable of being compatible and/or being incorporated in quantities, which can be very large, with graft copolymers of the formula (I), until a composition similar to an alloy is formed.

Polymer compositions of this type are primarily thermoplastic polymers such as PVC and its copolymers, for example, vinyl acetate/vinyl chloride copolymers, vinyl acetate/vinyl chloride/maleic acid copolymers, polyvinylidene chloride, polystyrene, polymethyl methacrylate, polyethylene, polypropylene, polyamides and polyethylene terephthalate, elastomers such as natural rubber, butyl rubber, nitrile rubber, polyisoprene, butadiene/styrene copolymer, various types of silicone rubber and resins such as urea/formaldehyde resins, phenol/formaldehyde resins, acrylic resins and epoxy resins.

The graft copolymers according to the invention are especially useful to impart blood compatibility to polyvinyl chloride (PVC) and its copolymers. This compatibility is related to the physical properties of the surfaces thereof. This is essential for biomedical devices comprising materials which are adopted to contact blood and which can be fabricated from PVC or copolymers thereof.

The graft copolymers according to the invention are especially useful for imparting biocompatibility when they are incorporated in a quantity of 0.1 to 10% by weight, calculated as silicone equivalent weight, to base polymer compositions which are typically employed in the biomedical field and which, in addition to PVC and its copolymers, include polyester-polyurethane copolymers, polysulfones, polycarbonates, polyolefins such as polyethylene, polypropylene, polystyrene, polyesters, polyacrylonitrile and polyethylene terephthalate.

It too has been observed, quite unexpectedly, that the graft polymers according to the invention, when combined with the above polymer compositions and in particular PVC and its copolymers, materials were produced which were flexible, in some cases transparent and, in particular, heat-sealable, with particularly pronounced haemocompatibility, while at the same time restricting the problems of migration of plasticizers. Moreover, these materials displayed outstanding oxygen permeability, which makes them most particularly suitable for the production of platelet residue bags for storing blood platelets. In fact, polymer compositions containing the additive according to the invention have outstanding low temperature resistance, as low as −100° C. and even less, an essential property for producing blood bags which are stored at approximately −80° C.

In addition, it has also been observed, in accordance with the invention, that a portion or all of the plasticizer in the base polymer composition could be replaced by the graft copolymer according to the invention. In this case 1 to 70 parts by weight of graft copolymer are advantageously incorporated per 100 parts of base polymer composition. A modified base polymer composition which has many uses is thus obtained.

In particular, an outstanding haemocompatibility is provided and it is possible to avoid the use of a plasticizer capable of migrating; good sealability is also obtained, coupled with good extrudability.

Furthermore, the graft copolymers added especially to PVC and its copolymers have very good internal and external lubricant properties.

The graft copolymers according to the invention can also be used for the removal of air and bubbles from plastisols.

A base elastomer composition, particularly in the case where it is butyl rubber, containing the graft copolymer according to the invention can be employed to produce strong, non-adhesive expandable bladders employed in the manufacture of tires according to the process described in French Pat. Nos. 1,247,744 and 2,494,294.

The incorporation of a graft copolymer in a base elastomer composition enables the production of conveyor belts with modified coefficients of friction.

The graft copolymers according to the invention can also be used to improve the anti-adhesive property of coatings made of silicone elastomers.

These coatings are usually applied to all surfaces which must have good dirt-resistance and/or a non-adhesive nature towards clinging, sticky or viscous materials. In particular, it is desirable to improve the dirt-resistance of coatings applied to structures which are entirely or partly immersed in fresh or sea water. These coatings usually contain derivatives which are toxic to small aquatic or marine animals; the use of silicone elastomers makes it possible to avoid this. However, the non-adhesive nature of silicone elastomers can be further improved by incorporation therein of the graft polymers of the invention.

Again, the present invention notably provides articles and materials which are especially useful for biomedical applications, and which feature a variety of base polymer compositions modified by incorporation therein of the graft copolymers of the invention.

In order to further illustrate the present invention and the advantages thereof, the following specific examples are given, it being understood that same are intended only as illustrative and in nowise limitative.

EXAMPLE 1

Preparation of a Polydimethylsiloxane oil containing Gammahydroxypropylated units in the Polymer Chain 500 g of a polydimethylpolyhydromethylsiloxane oil blocked by a trimethylsilyl end unit at both ends of the chain were placed in a 1 liter three-necked round flask. This oil contained, on average, 2.2 hydromethylsiloxane units per molecule in the chain. The number molecular mass Mn of the polysiloxane was 2125, its weight molecular mass Mw was 3970, its polydispersity index Ip was 1.9 and its viscosity V at 25° C. was 25 mPa.s. The oil was heated to a temperature of 120° C.

A mixture of allyl alcohol and a Pt° platinum catalyst was then added. The latter was a complex of Pt° and tetravinyltetramethylcyclosiloxane prepared in accordance with the teaching of U.S. Pat. Nos. 3,715,334, 3,775,452 and 3,814,730, and employed in a proportion of 8 mg of Pt° metal per kg of polysiloxanes. Allyl alcohol was added in a quantity such that it supplied a 50% molar excess of OH groups relative to the SiH groups of the oil, according to the following operating procedure:

80% of the alcohol to be added, containing all of the catalyst, was placed in a dropping funnel, 20% of this mixture was introduced and then the remainder of the alcohol was added, the temperature being maintained at 120° C. The addition was carried out over 4 hours.

When the addition of the alcohol was complete, the residual SiH groups were determined and the reaction was continued until total disappearance of the SiH groups in the reaction mixture (time: 3 hours). The excess alcohol was removed by maintaining the heating at 120° C. for 30 minutes under reduced pressure (13.3 millibars (mb)).

The oil obtained in this manner was colored and cloudy; after treatment with carbon black and filtration on Clarcel ® diatomaceous earth, a clear, colorless oil was obtained with a hydroxyl yield which was practically quantitative.

Properties of the Hydroxypropylated Polydimethylsiloxane oil (PDMS) obtained Calculated theoretical % by weight of OH: 1.63%, determined: 1.63–1.67%.

Mn=2210, Mw=5050, Ip=2.1, V 25° C.=67 mPa.s, 2.2 hydroxypropyl functions per mole.

EXAMPLE 2

The operating procedure of Example 1 was repeated, except that a polyhydromethylsiloxane oil having the following properties was placed into the reactor:

Mn=1325, Mw=1925, Ip=1.45, V 25° C.=12 mPa.s, on average it contained 2.5 SiH units/molecule in the chain.

A polydimethylsiloxane oil (PDMS) which was gammahydroxypropylated in the chain and which had the following properties, was then obtained:

Mn=1295, Mw=2095, Ip=1.6, V 25° C.=66 mPa.s, 2.4 OH functions per mole.

EXAMPLE 3

The operating procedure of Example 1 was repeated, except that a polyhydromethylsiloxane oil having the following properties was placed into the reactor:

Mn=2295, Mw=4000, Ip=1.75, V 25° C.=26 mPa.s, on average it contained 4.7 SiH units per molecule in the chain.

A PDMS oil which was gammahydroxypropylated in the chain and had the following properties was then obtained:

% by weight of OH (calculated theoretical 3.11%; determined 3.13%);

Mn=2260, Mw=4560, Ip=2.0, V 25° C.=267 mPa.s, 4.6 hydroxypropyl functions per molecule.

EXAMPLE 4

Synthesis of a graft copolymer via process (1)

Into a 6 liter reactor were charged 1200 g of monohydroxylatedpoly-epsilon-caprolactone (Mn 3000) (PCL) obtained by reacting a molar excess of caprolactone with one mole of a straight chain alcohol $C_{16}H_{33}OH$, followed by 68.5 g of hexamethylene diisocyanate (HMDI). The mixture was heated to 110° C., the reaction of the isocyanates with the hydroxy groups of the PCL being monitored. After the theoretical concentration of NCO groups had been reached, the solvent (butyl acetate) was added in a quantity sufficient to produce a homogeneous reaction mixture, i.e., a total of 3256 g of solvent including 3100 g in the prepolymer. 156 g of the same solvent were added to a dropping funnel containing 218.8 g of hydroxypropylated PDMS oil (Mn 1295, Mw 2095, Ip=1.6, V 25° C. 66 mPa.s, 2.4 equivalent of OH/mole) prepared in Example 2. The mixture in the dropping funnel was introduced over 5 minutes at 110° C. and then the reaction mixture was heated to reflux (temperature 126° C.) to distill continuously at atmospheric pressure and finishing under reduced pressure (6.6 mb).

The remaining NCO groups were determined and heating was continued at 130°–140° C. until all the isocyanate groups had disappeared (1 hour).

The copolymer obtained was poured into a tray, cooled and crushed.

Properties of the copolymer obtained

Weight yield: 100%. Melting point=60/70°.

Mn 5500 (polystyrene calibration), Mw 32,700, Ip=6% by weight of PDMS in the copolymer (silicone equivalent): 14%.

EXAMPLE 5

Synthesis of a graft copolymer via process (2)

1st step: Preparation of the polylactone prepolymer containing NCO groups devoid of free HMDI:

355 g of HMDI (2.111 moles) were placed in a 1 liter reactor and 600 g of monohydroxy PCL (Mn=2000) (0.3 mole) were introduced over 18 minutes at 120° C. The NCO groups were determined to ensure complete addition of HMDI to the PCL.

The prepolymer containing excess HMDI was stripped at 170° C. at a pressure of 0.3 mm of mercury. In this manner, a prepolymer devoid of free HMDI was obtained.

2nd step: Synthesis of the polymethylsiloxane-/polylactone copolymer (PDMS/PCL):

380 g of the prepolymer described above, followed by 1000 g of solvent, were placed in a 1 liter reactor. The mixture was heated to 110° C. and the mixture of PDMS oil obtained in Example 3 (96.2 g), dissolved in 111 g of solvent, i.e., a final solvent concentration of 70% by weight, was introduced over 5 minutes to produce a homogeneous mixture. The reaction mixture was heated to reflux and the solvent was distilled off continuously at atmospheric pressure, and then the concentration was finished under reduced pressure (6.6 mb). Concentration time, 2 hours. The heating was continued for 3 hours at 140° C. to complete the addition reaction of the NCO groups with the hydroxy groups of the PDMS oil.

The copolymer was poured into trays, cooled and crushed. Weight yield 100%, melting point 60°/70° C., % by weight of PDMS in the copolymer 20.2%.

EXAMPLE 6

Demonstration of Haemocompatibility

By using known methods, 0.9 mm bore catheters with an external diameter of 1.5 mm were produced using PVC containing 5% by weight of graft copolymer (0.7% by weight of silicone equivalent) obtained in Example 5 above, and also without the copolymer, to produce a control catheter.

Using these catheters, the Dudley test was carried out as described by B. Dudley, "Synthesis and characterization of Blood Compatible Surfaces", Trans. Am. Soc. Artif. Int. Organs, 22, p. 538 (1976).

The PVC employed was EKAVYL ® FK 70 PVC (Ip=122-132) manufactured and marketed by ATOCHEM.

In accordance with this test the catheter to be tested and a control catheter were implanted respectively in each of the dorsal veins of the front left and right paws of a dog maintained under anaesthesia. A ligature was applied to the vein in the region where the catheter was implanted. The Dudley test was carried out for 30 minutes, the catheters were then closed with a metal clip and then opened at various times to test their permeability and to determine the fibrinopeptide A (FPA) in the blood sample collected. Blood flow was on the order of 30 ml/h. The determination of FPA was carried out with the kit for immuno-enzymatic measurement of FPA Asserachrom ® FPA marketed by STAGO.

This measurement kit was specific for human FPA, but trials have shown that it can be employed for measuring FPA in the dog. It is well known that FPA measurement is at present the most sensitive and the earliest parameter enabling the activation of coagulation to be detected. When the content of FPA begins to exceed 20-40 nanograms per ml of blood, the blood is at the point of coagulating.

The results obtained are reported in Table 1 which follows.

From Table I it will be seen that coagulation took place in the control catheter after 15 to 25 minutes, while in the two tests carried out, (1) and (2), it occurred only after a period of more than 45 minutes for the catheter made of PVC with the additive according to the invention.

Furthermore, the determination of FPA of the blood flowing in the catheter according to the invention gave a value which remained below 15 nanograms/ml of blood.

TABLE I

| Duration of blood flow (min) | 0 | 2 | 5 | 10 | 15 | 20 | 25 | 30 | 35 | 40 | 45 |
|---|---|---|---|---|---|---|---|---|---|---|---|
| Catheter according to the invention | | | | | | | | | | | |
| (A) Test (1) | 23 | 3 | 5 | 5 | 4 | 5 | 3 | 1 | 3 | 2 | 2 |
| (A) Test (2) | 25 | 5.5 | 2 | 2 | 2.5 | 3 | 4 | 2 | 2 | 2 | 2 |
| Control catheter (A) | 30 | 10 | 36 | 10 | 24 | (B) | — | — | — | — | — |

(A): quantity of FPA determined, in nanograms per ml of blood
(B): coagulation.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. Graft copolymers having the average general formula:

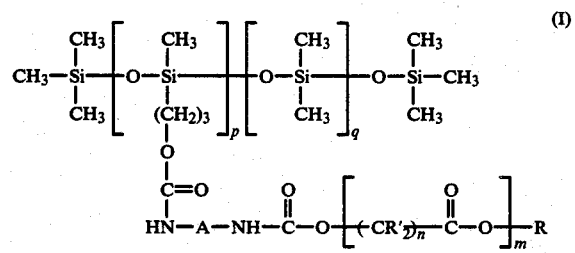

in which p is an integer or decimal ranging from 1.5 to 6, q is an integer or decimal ranging from 0 to 20, A is a divalent hydrocarbon having from 2 to 20 carbon atoms, n is an integer ranging from 3 to 12, m is an integer ranging from 2 to 25, the radicals R', which may be identical or different, are each hydrogen or $C_1$-$C_4$ alkyl, and R is a hydrocarbon having up to 24 carbon atoms.

2. The graft copolymers as defined by claim 1, wherein the formula (I) p ranges from 2 to 4, q ranges from 6 to 15, A is $-CH_2)_4$, $-CH_2)_5$, $-CH_2)_6$,

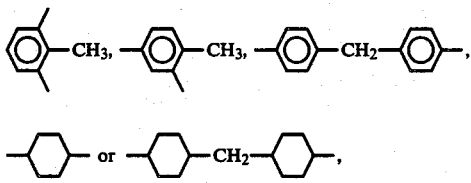

n is 3, 4 or 5, m ranges from 4 to 14, R' is hydrogen, and R is straight or branched chain $C_2$-$C_{25}$ alkyl, or phenylalkyl in which the alkyl moiety is straight or branched chain $C_2$-$C_{20}$ alkyl.

3. The graft copolymers as defined by claim 2, wherein the formula (I) n is 5, and R is straight chain $C_{14}$-$C_{20}$ alkyl.

4. The graft copolymers as defined by claim 1, wherein the residue of the methylhydroxypropylsiloxane recurring units are separated by at least one dimethylsiloxane recurring unit.

5. The graft copolymers as defined by claim 4, wherein the residue of the methylhydroxypropylsiloxane recurring units are separated by at least two dimethylsiloxane recurring units.

6. A process for the preparation of the graft copolymers as defined by claim 1, comprising reacting one mole of a polylactone having the general formula:

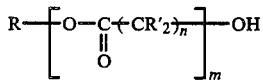 (V)

with one mole of a diisocyanate of the formula OCN—A—NCO, at a temperature ranging from about 90° to 140° C., and then reacting the resulting product, also at a temperature ranging from about 90° to 140° C., with a polysiloxane having the general formula:

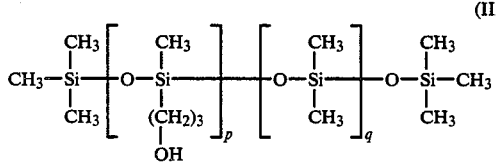 (III)

in an amount such that said polysiloxane (III) comprises about one equivalent of methylgammahydroxypropylsiloxane recurring units.

7. A process for the preparation of the graft copolymers as defined by claim 1, comprising (i) reacting one mole of a polylactone having the general formula:

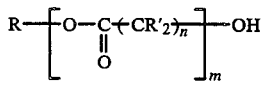 (V)

with a molar excess of a diisocyanate of the formula OCN—A—NCO, (ii) removing excess diisocyanate upon completion of said reaction (i), (iii) adding a polysiloxane (III) to said step (ii) reaction product, and reacting said polysiloxane (III) therewith, (iv) said polysiloxane (III) being added thereto in an organic solvent medium at a temperature ranging from about 90° to 160° C., in an amount such that it comprises about one equivalent of methylgammahydroxypropylsiloxane recurring units, and having the general formula:

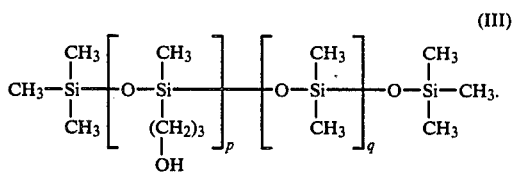 (III)

8. The product of the process as defined by claim 6.

9. The product of the process as defined by claim 7.

10. A composition of matter comprising 100 parts by weight of a base polymer, and from about 1 to 70 parts by weight of the graft copolymers as defined by claim 1, said base polymer being compatible with said graft copolymer.

11. A biocompatible composition of matter comprising a base polymer, and from about 0.1 to 10% by weight, calculated as weight of silicone equivalent, of the graft copolymer as defined by claim 1, said base polymer being compatible with said graft copolymers.

12. The composition of matter as defined by claim 10, said base polymer comprising homo- or copolymer of vinyl chloride.

13. The composition of matter as defined by claim 11, said base polymer comprising homo- or copolymer of vinyl chloride.

14. A shaped article comprising the composition of matter as defined by claim 10.

15. A shaped article comprising the composition of matter as defined by claim 11.

16. A shaped article comprising the composition of matter as defined by claim 12.

17. A blood bag comprising the composition of matter as defined by claim 11.

* * * * *